(12) United States Patent
Shin

(10) Patent No.: US 8,103,857 B2
(45) Date of Patent: Jan. 24, 2012

(54) MICROPROCESSOR CONTROL APPARATUS AS WELL AS METHOD AND PROGRAM FOR THE SAME

(75) Inventor: Hiromasa Shin, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 586 days.

(21) Appl. No.: 12/206,108

(22) Filed: Sep. 8, 2008

(65) Prior Publication Data

US 2009/0077358 A1    Mar. 19, 2009

(30) Foreign Application Priority Data

Sep. 13, 2007  (JP) .................................. 2007-237818

(51) Int. Cl.
*G06F 9/52* (2006.01)
*G06F 1/08* (2006.01)

(52) U.S. Cl. .................... 712/220; 712/227; 713/322
(58) Field of Classification Search .............. 712/220, 712/227; 713/322
See application file for complete search history.

(56) References Cited

U.S. PATENT DOCUMENTS

| | | | |
|---|---|---|---|
| 5,450,575 A * | 9/1995 | Sites ............................ 717/128 |
| 6,687,838 B2 * | 2/2004 | Orenstien et al. ............. 713/320 |
| 7,213,153 B2 * | 5/2007 | Hollander et al. ............ 713/187 |
| 2008/0126770 A1 * | 5/2008 | Morrow ........................ 712/233 |

FOREIGN PATENT DOCUMENTS

JP    2003-006046    1/2003

* cited by examiner

*Primary Examiner* — Daniel Pan
(74) *Attorney, Agent, or Firm* — Turocy & Watson, LLP

(57) ABSTRACT

There is provided with a microprocessor control apparatus for controlling an operating speed of a microprocessor which executes a program including instruction codes, including: a state observing unit observing an execution state of the program at predetermined timings before execution of a deadline instruction code; prediction data of a remaining calculation amount required before execution of the deadline instruction code completes for each of predefined execution states; a predicted calculation amount acquiring unit acquiring a remaining calculation amount corresponding to an observed execution state as a remaining predicted calculation amount; a remaining time calculating unit calculating a remaining time until the deadline of the deadline instruction code; an operating speed calculating unit calculating a minimum operation speed of the microprocessor that is required to process the remaining predicted calculation amount within the remaining time; and
a controlling unit controlling the microprocessor to operate at the minimum operating speed or higher.

5 Claims, 10 Drawing Sheets

```
void app_main(...) {
   ...;
   while(1) {
      len=sys_recv(...);
      if(len<=0)break;
      sys_init();
      if(...)
         app_sub1(...);
      else
         app_sub2(...);
         app_sub3(...);
      sys_fini(20ms);
   }
   ...;
}
```

```
void app_sub1(...) {
   ...;
   sys_send(...);
   ...;
}
void app_sub2(...) {
   ...;
   for(...) {
      ...;
      sys_send(...);
      ...;
   }
   sys_time(10ms);
   ...;
}
void app_sub3(...) {
   ...;
   sys_write(...);
   ...;
}
```

FIG. 3

- START
  —START OF PROGRAM
- INIT
  —START OF PERIODIC TASK
- CALL
  —CALLING OF SYSTEM CALL
- TIME
  —REACH TO DEADLINE-SPECIFIED POINT
- FINI
  —TERMINATION OF PERIODIC TASK
- STOP
  —TERMINATION OF PROGRAM

EXAMPLE OF STATE LABEL

| label | stack | deadline |
|---|---|---|
| s0 | app_main sys_init | ○ |
| s1 | app_main app_sub1 sys_send | × |
| s2 | app_main app_sub3 sys_write | × |
| s3 | app_main app_sub2 sys_send | × |
| s4 | app_main app_sub2 sys_time | ○ |
| s5 | app_main sys_fini | ○ |

A STATE DURING GENERATION OF A STATE TRANSITION TABLE

| EXECUTION PATH | Visit | CycIS | FreqS | CycIT | FreqT |
|---|---|---|---|---|---|
| s0,s1,s2,s5 | ⟨s0,1⟩→1,<br>⟨s1,1⟩→1,<br>⟨s2,1⟩→1,<br>⟨s3,1⟩→0,<br>⟨s3,2⟩→0,<br>⟨s4,1⟩→0,<br>⟨s5,1⟩→1, | ⟨s0,1⟩→0K,<br>⟨s1,1⟩→100K,<br>⟨s2,1⟩→200K,<br>⟨s3,1⟩→0,<br>⟨s3,2⟩→0,<br>⟨s4,1⟩→0,<br>⟨s5,1⟩→300K, | ⟨s0,1⟩→1,<br>⟨s1,1⟩→1,<br>⟨s2,1⟩→1,<br>⟨s3,1⟩→0,<br>⟨s3,2⟩→0,<br>⟨s4,1⟩→0,<br>⟨s5,1⟩→1, | (⟨s0,1⟩,⟨s4,1⟩)→0,<br>(⟨s0,1⟩,⟨s5,1⟩)→300K,<br>(⟨s1,1⟩,⟨s5,1⟩)→200K,<br>(⟨s2,1⟩,⟨s5,1⟩)→100K,<br>(⟨s3,1⟩,⟨s4,1⟩)→0,<br>(⟨s3,1⟩,⟨s5,1⟩)→0,<br>(⟨s3,2⟩,⟨s4,1⟩)→0,<br>(⟨s3,2⟩,⟨s5,1⟩)→0,<br>(⟨s4,1⟩,⟨s5,1⟩)→0, | (⟨s0,1⟩,⟨s4,1⟩)→0,<br>(⟨s0,1⟩,⟨s5,1⟩)→1,<br>(⟨s1,1⟩,⟨s5,1⟩)→1,<br>(⟨s2,1⟩,⟨s5,1⟩)→1,<br>(⟨s3,1⟩,⟨s4,1⟩)→0,<br>(⟨s3,1⟩,⟨s5,1⟩)→0,<br>(⟨s3,2⟩,⟨s4,1⟩)→0,<br>(⟨s3,2⟩,⟨s5,1⟩)→0,<br>(⟨s4,1⟩,⟨s5,1⟩)→0, |
| s0,s3,s4,s2,s5 | ⟨s0,1⟩→1,<br>⟨s1,1⟩→0,<br>⟨s2,1⟩→1,<br>⟨s3,1⟩→1,<br>⟨s3,2⟩→0,<br>⟨s4,1⟩→1,<br>⟨s5,1⟩→1, | ⟨s0,1⟩→0K,<br>⟨s1,1⟩→0,<br>⟨s2,1⟩→300K,<br>⟨s3,1⟩→100K,<br>⟨s3,2⟩→0,<br>⟨s4,1⟩→200K,<br>⟨s5,1⟩→400K, | ⟨s0,1⟩→2,<br>⟨s1,1⟩→1,<br>⟨s2,1⟩→2,<br>⟨s3,1⟩→1,<br>⟨s3,2⟩→0,<br>⟨s4,1⟩→1,<br>⟨s5,1⟩→2, | (⟨s0,1⟩,⟨s4,1⟩)→200K,<br>(⟨s0,1⟩,⟨s5,1⟩)→700K,<br>(⟨s1,1⟩,⟨s5,1⟩)→200K,<br>(⟨s2,1⟩,⟨s5,1⟩)→200K,<br>(⟨s3,1⟩,⟨s4,1⟩)→100K,<br>(⟨s3,1⟩,⟨s5,1⟩)→300K,<br>(⟨s3,2⟩,⟨s4,1⟩)→0,<br>(⟨s3,2⟩,⟨s5,1⟩)→0,<br>(⟨s4,1⟩,⟨s5,1⟩)→200K, | (⟨s0,1⟩,⟨s4,1⟩)→1,<br>(⟨s0,1⟩,⟨s5,1⟩)→2,<br>(⟨s1,1⟩,⟨s5,1⟩)→1,<br>(⟨s2,1⟩,⟨s5,1⟩)→2,<br>(⟨s3,1⟩,⟨s4,1⟩)→1,<br>(⟨s3,1⟩,⟨s5,1⟩)→1,<br>(⟨s3,2⟩,⟨s4,1⟩)→0,<br>(⟨s3,2⟩,⟨s5,1⟩)→0,<br>(⟨s4,1⟩,⟨s5,1⟩)→1, |
| s0,s3,s3,s4,s2,s5 | ⟨s0,1⟩→1,<br>⟨s1,1⟩→0,<br>⟨s2,1⟩→1,<br>⟨s3,1⟩→1,<br>⟨s3,2⟩→1,<br>⟨s4,1⟩→1,<br>⟨s5,1⟩→1, | ⟨s0,1⟩→0K,<br>⟨s1,1⟩→0,<br>⟨s2,1⟩→400K,<br>⟨s3,1⟩→100K,<br>⟨s3,2⟩→200K,<br>⟨s4,1⟩→300K,<br>⟨s5,1⟩→500K, | ⟨s0,1⟩→3,<br>⟨s1,1⟩→1,<br>⟨s2,1⟩→3,<br>⟨s3,1⟩→2,<br>⟨s3,2⟩→1,<br>⟨s4,1⟩→2,<br>⟨s5,1⟩→3, | (⟨s0,1⟩,⟨s4,1⟩)→500K,<br>(⟨s0,1⟩,⟨s5,1⟩)→1200K,<br>(⟨s1,1⟩,⟨s5,1⟩)→200K,<br>(⟨s2,1⟩,⟨s5,1⟩)→300K,<br>(⟨s3,1⟩,⟨s4,1⟩)→300K,<br>(⟨s3,1⟩,⟨s5,1⟩)→700K,<br>(⟨s3,2⟩,⟨s4,1⟩)→100K,<br>(⟨s3,2⟩,⟨s5,1⟩)→300K,<br>(⟨s4,1⟩,⟨s5,1⟩)→400K, | (⟨s0,1⟩,⟨s4,1⟩)→2,<br>(⟨s0,1⟩,⟨s5,1⟩)→3,<br>(⟨s1,1⟩,⟨s5,1⟩)→1,<br>(⟨s2,1⟩,⟨s5,1⟩)→3,<br>(⟨s3,1⟩,⟨s4,1⟩)→2,<br>(⟨s3,1⟩,⟨s5,1⟩)→2,<br>(⟨s3,2⟩,⟨s4,1⟩)→1,<br>(⟨s3,2⟩,⟨s5,1⟩)→1,<br>(⟨s4,1⟩,⟨s5,1⟩)→2, |

EXAMPLE OF STATE TRANSITION TABLE

| from/to | <s4,1> | <s5,1> |
|---|---|---|
| <s0,1> | 2/3 = 67%<br>500/2 = 250K | 3/3 = 100%<br>1200/3 = 400K |
| <s1,1> | 0/1 = 0%<br>– | 1/1 = 100%<br>1200/1 = 200K |
| <s2,1> | 0/3 = 0%<br>– | 3/3 = 100%<br>300/2 = 100K |
| <s3,1> | 2/2 = 100%<br>300/2 = 150K | 2/2 = 100%<br>700/2 = 350K |
| <s3,2> | 1/1 = 100%<br>100/1 = 100K | 1/1 = 100%<br>300/1 = 300K |
| <s4,1> | 0/2 = 0%<br>– | 2/2 = 100%<br>400/2 = 200K |
| deadline | 10ms | 20ms |

FIG. 10

EXAMPLE OF STATE TRANSITION TABLE

| from/to | <s4,1> | <s5,1> |
|---|---|---|
| <s0,1> | 10%<br>300K | 100%<br>300K |
| <s1,1> | 0%<br>– | 100%<br>200K |
| <s2,1> | 0%<br>– | 100%<br>100K |
| <s3,1> | 100%<br>200K | 100%<br>400K |
| <s3,2> | 100%<br>100K | 100%<br>300K |
| <s4,1> | 0%<br>– | 100%<br>200K |
| deadline | 10ms | 20ms |

FIG. 11

MICROPROCESSOR CONTROL APPARATUS AS WELL AS METHOD AND PROGRAM FOR THE SAME

CROSS REFERENCE TO RELATED APPLICATIONS

This application is based upon and claims the benefit of priority from the prior Japanese Patent Applications No. 2007-237818, filed on Sep. 13, 2007; the entire contents of which are incorporated herein by reference.

BACKGROUND OF THE INVENTION

1. Field of the Invention

The present invention relates to a microprocessor control apparatus, a microprocessor control method, and a microprocessor control program for controlling the operating speed of a microprocessor.

2. Related Art

In the development of embedded systems, balancing competing goals for assurance of service quality and reduction of energy consumption is required. Power consumption of a microprocessor (the amount of energy consumed per unit time), which accounts for a large proportion of energy consumption, increases by about the third power of its operating speed (e.g., Power=alpha*Capacitance*Voltage*Voltage*Frequency, Voltage∝Frequency, where "∝" represents proportionality and "alpha" denotes a constant). Quality of service can be interpreted as a deadline or time limit for processing. Execution time of a task (a certain unit of processing) is inversely proportional to processing speed, and to minimize the energy consumption of task processing, it is best in principle to make a microprocessor run at the lowest speed within a deadline. In recent years, processors that permit to change its processing speed during execution have been brought into practical use, which is enabling reduction of energy consumption based on this principle.

However, it is difficult to appropriately adjust the operating speed of a processor when a general program is processed. For example, since changing a processor's operating speed requires certain instruction cycles (e.g., several hundred cycles), a task has to be a relatively large processing unit. In general, a large processing unit includes iterations and/or branches and an associated calculation amount is difficult to predict. Also, the deadline for a program is not given on a per-task basis but as (a tuple of) time(s) within which an executable statement in a program should be reached. Known speed control techniques can be generally classified into ones based on manual task division (an advantage: speed adjustment of fine granularity, a disadvantage: task division is manually done) and ones based on feedback control (an advantage: requires no task division, a disadvantage: speed adjustment of coarse granularity).

SUMMARY OF THE INVENTION

According to an aspect of the present invention, there is provided with a microprocessor control apparatus for controlling an operating speed of a microprocessor which executes a program including instruction codes in which a deadline is specified for at least one instruction code, comprising:

a state observing unit configured to observe an execution state of the program at a plurality of predetermined timings prior to execution of a deadline instruction code which is an instruction code for which the deadline is specified;

a data storage unit configured to store prediction data of a remaining calculation amount that is required before execution of the deadline instruction code completes for each of a plurality of predefined execution states;

a predicted calculation amount acquiring unit configured to acquire a remaining calculation amount corresponding to an observed execution state as a remaining predicted calculation amount from the prediction data;

a remaining time calculating unit configured to calculate a remaining time until the deadline of the deadline instruction code;

an operating speed calculating unit configured to calculate a minimum operation speed of the microprocessor that is required to process the remaining predicted calculation amount within the remaining time; and a controlling unit configured to control the microprocessor to operate at the minimum operating speed or higher.

According to an aspect of the present invention, there is provided with a microprocessor control method for controlling an operating speed of a microprocessor which executes a program including instruction codes in which a deadline is specified for at least one instruction code, comprising:

observing an execution state of the program at a plurality of predetermined timings prior to execution of a deadline instruction code which is an instruction code for which the deadline is specified;

storing prediction data of a remaining calculation amount that is required before execution of the deadline instruction code completes for each of a plurality of predefined execution states, in a storage;

acquiring a remaining calculation amount corresponding to an observed execution state as a remaining predicted calculation amount from the prediction data in the storage;

calculating a remaining time until the deadline of the deadline instruction code;

calculating a minimum operation speed of the microprocessor that is required to process the remaining predicted calculation amount within the remaining time; and controlling the microprocessor to operate at the minimum operating speed or higher.

According to an aspect of the present invention, there is provided with a computer program storage medium storing a computer program for causing a computer controlling an operating speed of a microprocessor which executes a program including instruction codes in which a deadline is specified for at least one instruction code, to execute instructions to perform the steps of:

observing an execution state of the program at a plurality of predetermined timings prior to execution of a deadline instruction code which is an instruction code for which the deadline is specified;

accessing prediction data of a remaining calculation amount that is required before execution of the deadline instruction code completes for each of a plurality of predefined execution states, in a storage;

acquiring a remaining calculation amount corresponding to an observed execution state as a remaining predicted calculation amount from the prediction data in the storage;

calculating a remaining time until the deadline of the deadline instruction code;

calculating a minimum operation speed of the microprocessor that is required to process the remaining predicted calculation amount within the remaining time; and controlling the microprocessor to operate at the minimum operating speed or higher.

BRIEF DESCRIPTION OF THE DRAWINGS

FIG. 3 shows an example of an application program used for providing specific description in description that follows;

FIG. 8 shows a table containing examples of state labels;

FIG. 9 shows a table of information that is obtained during generation of a state transition table;

FIG. 10 shows an example of the state transition table generated from the table of FIG. 9; and FIG. 11 shows another example of the state transition table.

DETAILED DESCRIPTION OF THE INVENTION

Figure 1:
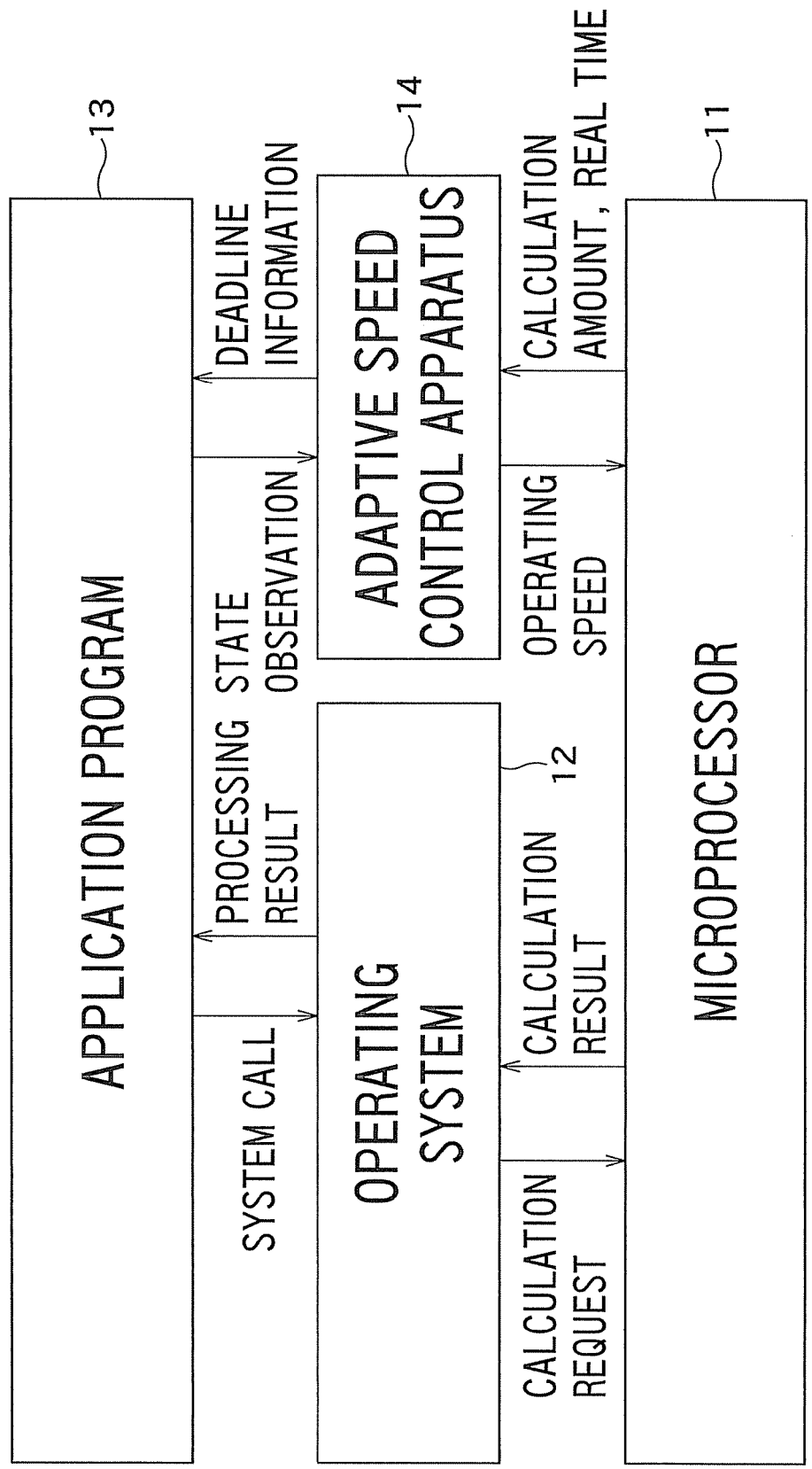
FIG. 1 shows an embedded system according to the present invention that contains an operating system.

FIG. 1 shows a soft real-time embedded system according to the present invention which contains an operating system.

This embedded system includes a microprocessor (CPU) 11, an operating system or OS 12 which is executed by the microprocessor 11, an application program 13 which runs on the operating system 12, and an adaptive speed control apparatus 14 which adjusts the operating speed of the microprocessor 11 while the microprocessor 11 executes the application program 13. The microprocessor 11 supports Dynamic Voltage Frequency Scaling (DVFS), for example. Functions of the adaptive speed control apparatus 14 may be incorporated as a portion of the operating system 12, for instance.

FIG. 3 shows an example of the application program 13.

The application program 13 is made up of a number of instruction codes and contains a number of subroutines. Subroutines that start with a prefix "app_" belong to the application program and ones with a prefix "sys_" belong to system calls for the OS. A system call "sys_" is a subroutine that is utilized by the application program 13 for requesting processing from the operating system.

This application program goes into data reception wait "sys_recv" at the beginning of a main loop of a subroutine "app_main", and a section immediately following reception of data to the next reception wait (i.e., from "sys_init" to "sys_fini") is a portion that is periodically executed (a periodic task). "Sys_init" and "sys_fini" are system calls that define the start and end of a periodic task section. "While (1)" is an instruction code that orders repetition of instructions which are contained between "{" and "}" that follow the "while (1)".

In the periodic task, a subroutine "app_sub1" or a subroutine "app_sub2" is executed depending on a conditional branch and thereafter a subroutine "app_sub3" is executed. The subroutines "app_sub1" and "app_sub2" execute data transmission "sys_send" and the subroutine "app_sub3" executes file writing "sys_write".

System calls "sys_" are classified into ones that are relevant to control of operating speed and ones that are not relevant. The latter system calls include instructions for performing read or write of standard files and/or communication via a network ("sys_recv", "sys_send", "sys_write"). The former system calls include "sys_init" that indicates the start of a periodic task, "sys_fini" that indicates the end of a periodic task, and "sys_time" that specifies a deadline (a time limit of completion) in a periodic task.

"Sys_time (10 ms)" in "void app_sub2" means that it must be within in 10 ms from the start of a periodic task "sys_init" to when the execution of an instruction code that immediately precedes "sys_time (10 ms)" is completed. In other words, "sys_time (10 ms)" specifies a deadline to complete the execution of an instruction code that immediately precedes it (a deadline instruction code). Likewise, "sys_fini (20 ms)" means that a periodic task must be terminated (or execution of "app_sub3" must be completed) within 20 ms from the start of the periodic task. That is, "sys_fini (20 ms)" designates the deadline for the last instruction code "app_sub3" in the periodic task. Note that start of the periodic task, "sys_init", is 0 ms.

Figure 4:
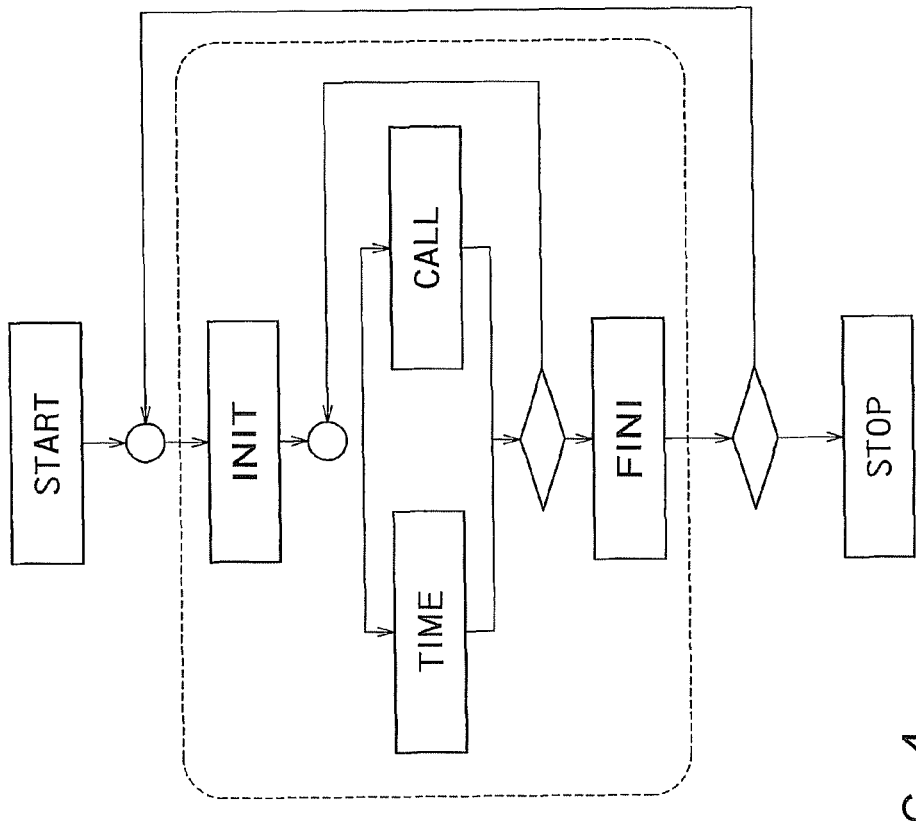
FIG. 4 shows an outline of a control flow for the application program.

As mentioned above, the application program 13 of this embodiment contains a periodic task that is repetitively executed. An outline of a control flow of the application program 13, especially that of a periodic task, is illustrated in FIG. 4.

The application program 13 includes a periodic task which is repetitively executed between the start (START) and the end (STOP). In the figure, a portion surrounded by a dashed line represents a periodic task, contained between "sys_init" and "sys_fini (20 ms)". The periodic task has its start (INIT) and end (FINI), and crossing of a deadline position (TIME) and calling of system calls (CALL) are repeated between the start (INIT) and the end (FINI). For example, an application program for playback of a moving image has the start and end of the program and a periodic task that calculates one frame of the moving image, and various system calls and deadlines exist in the periodic task. In the figure, "INIT" corresponds to "sys_init", "FINI" to "sys_fini (20 ms)", "TIME" to "sys_time (10 ms)", and "CALL" to "sys_send" and "sys_write", for example.

Figure 2:
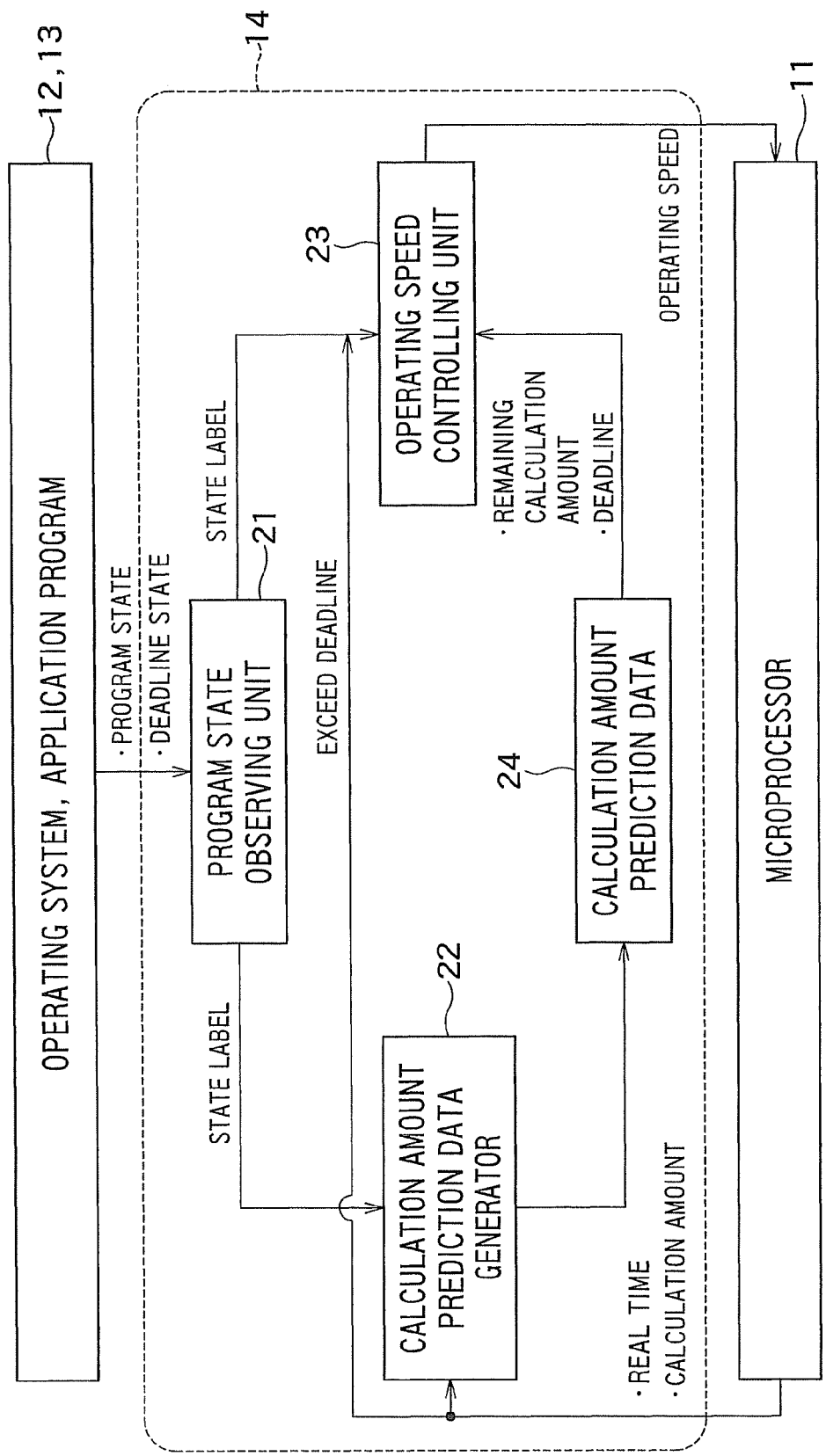
FIG. 2 shows a detailed configuration of an adaptive speed control apparatus.

FIG. 2 shows a detailed configuration of the adaptive speed control apparatus 14 of FIG. 1.

A program state observing unit 21 observes the state of the application program during execution of a periodic task at the time of an OS call (a system call) and outputs a state label representing the observed state to a calculation amount prediction data generator 22 or an operating speed controlling unit 23. The program state observing unit 21 corresponds to a state observing unit and a second state observing unit, for example.

The calculation amount prediction data generator 22 generates calculation amount prediction data 24 which represents a predicted calculation amount (or a predicted cycle count) and the like for reaching a deadline state (i.e., a state for which a deadline is specified among the states) from each of states obtained from observation of the periodic task, that is, to when execution of an instruction code for which a deadline is specified (a deadline instruction code) completes. The calculation amount prediction data 24 is also called a state transition table. The generated calculation amount prediction data 24 is stored in a data storage unit, for instance.

From the calculation amount prediction data 24 and based on the present program state, the operating speed controlling unit 23 determines a remaining calculation amount that is required by the time execution of the instruction code for which a deadline is specified (a deadline instruction code) is completed, and based on the determined calculation amount and the remaining time before the deadline, decides an operating speed of the microprocessor which should be applied until transition to the next program state. For example, the operating speed controlling unit 23 decides the minimum speed that is required to process the determined calculation amount within the remaining time as the operating speed of the microprocessor. Alternatively, the operating speed controlling unit 23 selects an operating speed that is higher than the minimum speed and is of the smallest value from among a number of predesignated operating speeds.

The operating speed controlling unit 23 also adjusts the operating speed in accordance with a completion rate of deadlines (the rate of deadlines actually being met) on the assumption that the application program 13 does not terminate within a deadline due to increase of load on the system and the like. For example, the lower the completion rate is, a higher operating speed is set than the operating speed that is determined or selected in the above-mentioned manner. The operating speed controlling unit 23 includes a remaining time calculating unit, an operating speed calculating unit, a controlling unit, and a completion rate calculating unit, for instance.

Hereinafter, the operation of the adaptive control apparatus 14 will be described in greater detail.

However, the description that follows sometimes utilizes various instruction codes to illustrate the processing procedures of the program state observing unit 21, calculation amount prediction data generator 22, and operating speed controlling unit 23. Such description abides by the following rules: a suffix "_start" is attached to processing that is performed when the application program starts (START), a suffix "_stop" to processing that is performed when the program terminates (STOP), a suffix "_init" to processing that is performed when a periodic task starts (INIT), a suffix "_fini" to processing that is performed when the periodic task terminates (FINI), and a suffix "_call" to processing that is performed upon a system call (CALL). To distinguish a system call from a deadline notification, a suffix "_time" is appended.

Processing performed by the adaptive speed control apparatus 14 of FIG. 2 generally includes a learning phase and a control phase. In the learning phase, the state of the application program is observed during execution of a periodic task and a state transition table (calculation amount prediction data) is created. In the control phase, using the observed state of the application program and the state transition table, a calculation amount up to a position at which a deadline is specified (sys_time, sys_fini), namely the calculation amount required by when the execution of a deadline instruction code completes, is predicted. Then, the operating speed of the microprocessor is controlled based on the predicted calculation amount and the remaining time before the deadline.

In the following, overviews of the learning and control phases are described and thereafter the details of the phases are described.

<Overview of the Learning Phase>

First, the application program 13 is executed, and the state of the application program 13 is observed by the program state observing unit 21 during execution of a periodic task. The state is observed when a system call "sys_" is called and the observed state is saved as a state label.

The calculation amount prediction data generator 22 generates a state transition graph (see FIGS. 5 and 6 discussed below) that represents state transitions in the periodic task based on state labels obtained by the program state observing unit 21. The calculation amount prediction data generator 22 then generates a state transition table (calculation amount prediction data) that represents an average calculation amount (a predicted calculation amount) of the microprocessor required to reach a deadline state from each state in the state transition graph as well as the probability of reaching each deadline state.

<Overview of the Control Phase>

The application program 13 is executed and its state is observed by the program state observing unit 21 during execution of a periodic task. Using the observed state and the state transition table obtained in the learning phase, the operating speed controlling unit 23 decides an operating speed for the next state upon each state transition (i.e., each time there is a system call), and has the microprocessor (CPU) 11 operate at that speed until the next state transition. In this way, the operating speed of the microprocessor (CPU) 11 during execution of a periodic task is controlled at the timing of system calls (i.e., timing of state transitions). The control phase and the learning phase may be executed either in sequence or in parallel (e.g., the calculation amount prediction data is modified during operation).

<Details of the Learning Phase>

The program state observing unit 21 observes the state of the application program when there is a system call while a periodic task is executed. The state is observed at the time of a system call because load on the microprocessor would become heavy if there are too many points of observation (e.g., if the state is observed also when subroutines other than system calls are called). Therefore, the present invention does not exclude state observation at the time other than system calls.

In this embodiment, an observed state corresponds to a tuple of active subroutines (including both a system call and an application subroutine) at the time of observation (i.e., immediately after a system call). One label is given to one tuple. For instance, when subroutines are executed in the order of "app_main", then "sys_init", and state observation is performed upon call of "sys_init", a state label representing a tuple of "app_main" and "sys_init" is obtained.

FIG. 8 shows a table resulting from observation of the state of the application program of FIG. 3 (examples of state labels).

This table shows a total of six state labels, s0, s1, s2, s3, s4 and s5. That is, a state that is observed when a system call is called belongs to one of the six states s0, s1, s2, s3, s4 and s5. A "stack" field in the table contains tuples of subroutines belonging to the respective states, wherein subroutines were called earlier in time as they go to the left in the figure. State observation was performed at the point when the rightmost subroutine in the figure (a system call) was called.

In the "deadline" field in the table, "O" is stored when the rightmost system call in the table specifies a deadline and "x" is stored when it does not specify one. "Sys_init" indicating start of a periodic task is assumed to specify a deadline for the sake of processing simplicity, for example.

To be specific, a tuple of subroutines corresponding to one state can be obtained as a list of return addresses for subroutines which are stacked in a call stack for the application program. The call stack for the program stores data for incomplete subroutines. Data that corresponds to one subroutine is called a frame, which includes local variables of the subroutine, a return address, a starting address of the previous frame and so forth. Values in the frame are stored at an address positioned at a certain offset from the frame's starting address. The offset value in the frame and register names differ depending on the execution environment, but the basic procedure is similar to the one shown herein.

This embodiment assumes that a value in a register called a frame pointer ($fp) points to the starting address (pos) of the topmost or present frame and the contents stored at a frame's starting address (mem[pos]) indicates the previous frame's starting address. Contents positioned at an offset value (off) away from the frame's starting address (ret=mem[pos+off]) represents the return address for the subroutine. The above-mentioned list can be obtained by recording tuples of return addresses (ret) while tracing the call stack until the frame starting address (pos) corresponds with the stack bottom (bot). Description of "bot::Uint" in the pseudo-programs below means that "the type of a variable 'bot' is an unsigned integer 'Uint'".

An exemplary processing procedure for obtaining a list in which tuples of return addresses in the stack are stored is shown below.

```
Name: app_stack
Function: to obtain a list storing tuples of return addresses in
a stack
Constants:
    Stack bottom, bot::Uint (a constant)
    Offset, off::Uint (a constant)
Inputs:
    OS call identifier    sid::Uint
    Stack-allocated memory    mem::Map of Uint to Uint
Output:
    Stack return address sequence    seq::Seq of Uint
app_stack( )
    Uint bot=stack bottom
    Uint off=offset
    Uint sid=OS call identifier
    Uint pos=($fp)    frame pointer
    Uint ret=return address
    pos←$fp
    ret←sid
    seq←[ret]//an empty list
    while pos!=bot do
        pos←mem[pos]
        ret←mem[pos+off]
        seq←seq+[ret]
    od
    return seq
```

The calculation amount prediction data generator 22 successively obtains state labels (or lists) from the program state observing unit 21, and uses the obtained state labels to create a state transition graph representing state transitions in the application program. The state transition graph can be considered as abstraction of characteristics that pertain to the operation of the application program.

Figure 5:
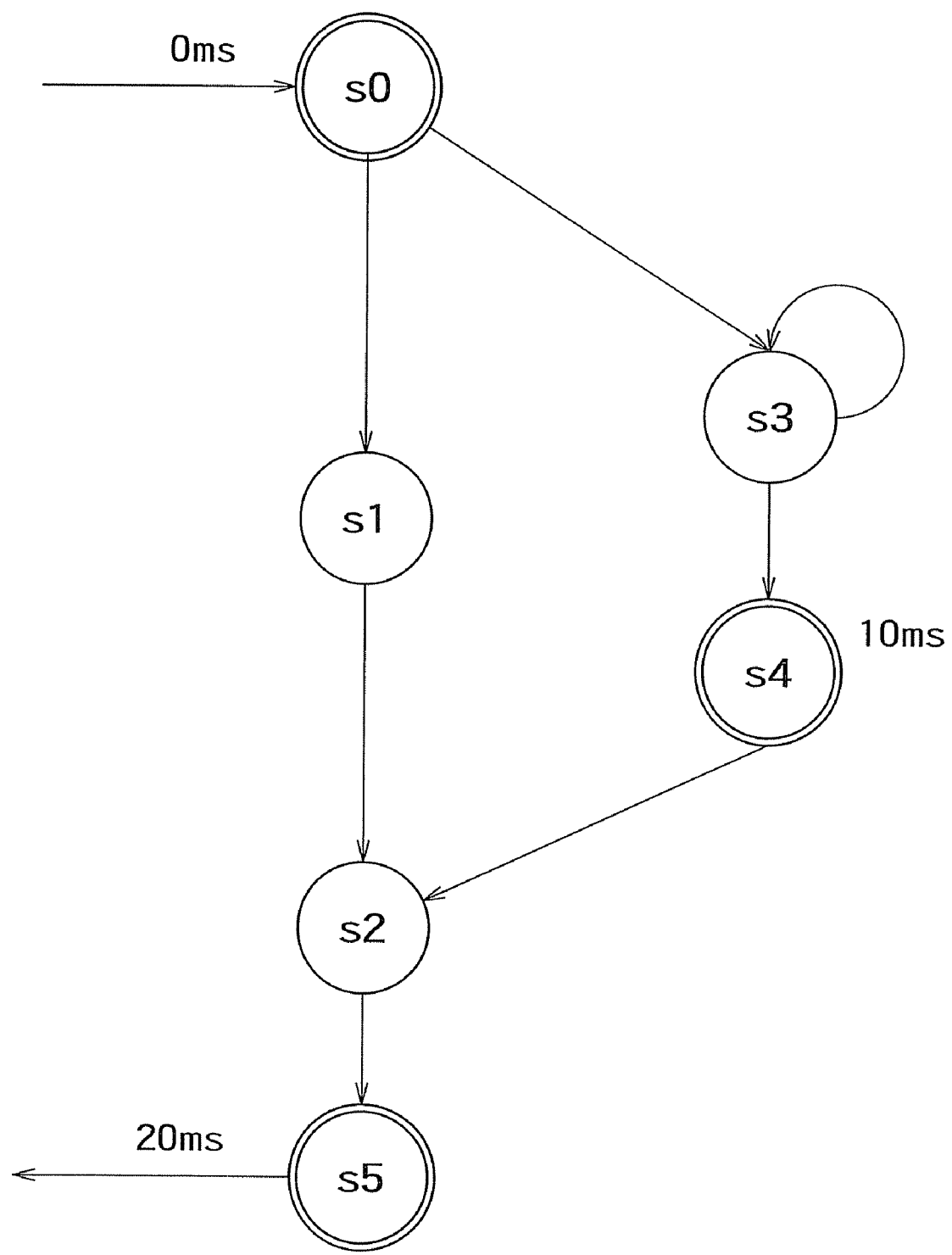
FIG. 5 shows an example of a state transition graph.

FIG. 5 shows an example of the state transition graph created from the application program of FIG. 3.

The state transition graph is a kind of directed graph. The state transition graph represents a state of the application program as observed at the time of a system call as a node, which is connected by edges with nodes representing the previous and subsequent states. S0, s1, s2, s3, s4 and s5 in FIG. 5 represent nodes and these nodes s0, s1, s2, s3, s4 and s5 correspond to the states (the call stack of the application program) shown in the table of FIG. 8.

Figures 0 ms, 10 ms and 20 ms in FIG. 5 denote deadlines. That is to say, assuming that state s0 is at 0 ms, state s4 must be reached within 10 ms and state "s5" must be reached within 20 ms. A recursive arrow to label "s3" means that label "s3" has been repeatedly obtained. More specifically, it means that "sys_send" in the "for" statement in "void app_sub2" of the application program of FIG. 3 has been repetitively and consecutively executed plural times.

A definition of a state transition graph "M" is shown below. It is assumed that a label set "S" is a set of state labels, and a start label set "I", deadline label set "D", and finish label set "F" are subsets of the set "S". A set of start labels for a periodic task is denoted as "I" and a set of finish labels as "F". The sets "F" and "I" have no common elements (F∩I=φ), where "φ" represents an empty set. A label set "S–D" (the remainder of "S" minus "D") corresponds to normal system calls. A deadline label "d∈D" has a deadline "T(d)".

```
M=(S,I,D,F,R,T)
    Label set: S    (in this example, S={s0,s1,s2,s3,s4,s5})
    Start label set: I⊆D    (in this example, I={s0})
    Deadline label set: D⊆S    (in this example, D={s0,s4,s5})
    Finish label set: F⊆D    (in this example, F={s5})
    Label transition relation:    R⊆S×S    (in this example,
R={(s0,s1),(s1,s2),(s0,s3),(s3,s3),(s3,s4),(s4,s2),(s2,s5)}
    Deadline assignment: T: D→Time    (in this example,
T={s0→0 ms, S4→10 ms, s5→20 ms})
```

While the example above acquires a tuple of active subroutines (a list of return addresses in the call stack) as a state label, it is also possible to expand the contents of the state label and obtain a tuple of a return address list in the call stack and a frequency of occurrence (the number of calls per cycle) as the state label.

Figure 6:
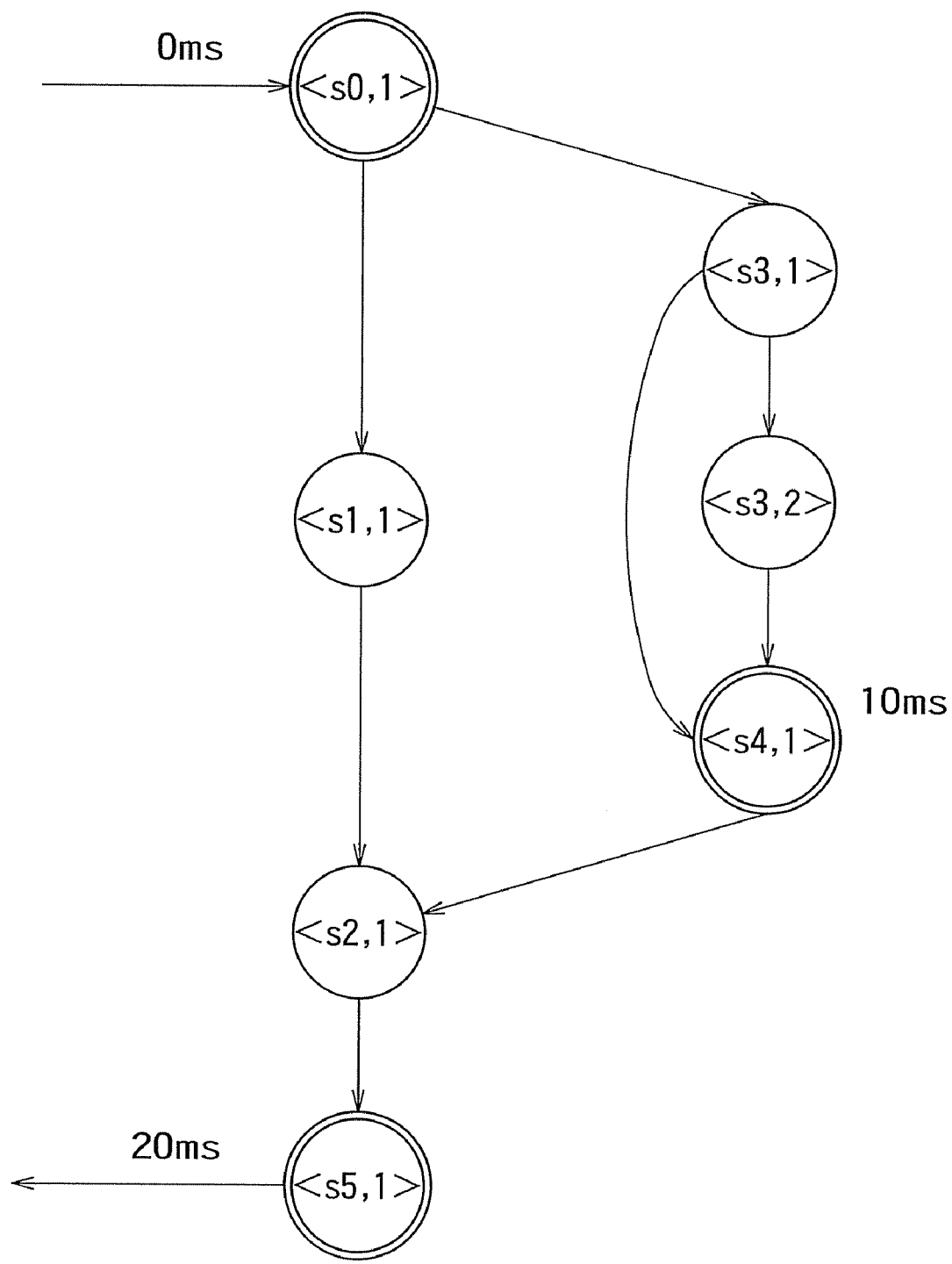
FIG. 6 shows another example of the state transition graph.

FIG. 6 shows an example of the state transition graph which is generated using an expanded state label.

The expanded state label is represented as a pair of a return address list "s" and its frequency of occurrence "f(s)", i.e., <s,f(s)>. For example, <s3,1> means the first occurrence of "s3" and <s3,2> means the second occurrence of "s3". FIG. 5 represents multiple occurrences of "s3" with a recursive arrow, whereas in FIG. 6 each occurrence of "s3" is obtained as a different state. It is understood from the figure that there are both a case where a transition occurs from <s3,1> to <s4,1> via <s3,2> and a case where a transition occurs directly from <s3,1> to <s4,1>.

Here, a definition of the state transition graph "M'" having the expanded state label is shown below. A label set "S'" is a set of state labels, and a start label set "I'", deadline label set "D'", and finish label set "F'" are subsets of the set "S'". A set of start labels for a periodic task is denoted as "I'" and a set of finish labels is denoted as "F'". The sets "F'" and "I'" have no common elements (F'∩I'=φ), where φ represents an empty set. A label set "S'–D'" (the remainder of "S'" minus "D'") corresponds to normal system calls. A deadline label "d'∈D'" has a deadline "T'(d')".

```
Label set :S'    (in this example,
S'={<s0,1>,<s1,1>,<s2,1>,<s3,1>,<s3,2>,<s4,1>,<s5,1>})
    Start label set: I'⊆D'=D×{1}    (in this example, I'={<s0,1>})
    Deadline label set: D'⊆S'    (in this example,
D'={<s0,1>,<s4,1>,<s5,1>})
    Finish label set: F⊆D'    (in this example,
F'={<s5,1>})
    Label transition relation:    R'⊆S'×S'    (in this example,
R'={(<s0,1>,<s1,1>),(<s1,1>,<s2,1>),(<s0,1>,<s3,1>),(<
s3,1>,<s3,2>),(<s3,1>,<s4,1>),(<s3,2>,<s4,1>),(<s4,1>,
<s2,1>),(<s2,1>,<s5,1>)}
    Deadline assignment: T':D'→Time    (in this example,
T'={<s0,1>→0 ms,<s4,1>→10 ms,<s5,1>→20 ms)}
```

A procedure of calculating an expanded state label is shown below. The following procedure of calculation assumes that a set "S" is a set for maintaining a list of return addresses in a call stack that have occurred in the past and a map "f" is a map for maintaining the occurrence frequency of the return address list in the same call stack. The set "S" is initialized to an empty state when a program is started (START) and a return address list is added to the set "S" at the time of a system call (CALL). The map "f" is initialized to an empty state when a program is started (START) and the frequency of occurrence maintained in the map "f" is incremented when there is a system call (CALL). As mentioned above, a state label is a pair of the return address list "s" and its frequency of occurrence "f(s)", <s,f(s)>.

```
Function: to generate a label for calculating "M"' (with
occurrence count)
Note: Label=(Seq of Uint,Uint)
void label__start( )
    S::Set of State ← φ
    f::Map of S to N ← φ
    return
Label label__init( )
    for each s ∈ S do
        f(s) ← 0
    od
    return label__call( )
Label label__fini( )
    reurn label__call( )
Label label__call( )
    s ← app__stack( )
    if not s ∈ S then
        f(s) ← 0
        S ← S ∪ {s}
    fi
    f(s) ← f(s) + 1
    return <s,f(s)>
```

The calculation amount prediction data generator 22 generates a state transition table that represents the probability of reach (or execution rate of deadline instruction codes) from each state to a deadline state in the state transition graph (FIG. 5 or 6) thus created and an average calculation amount (or a predicted calculation amount) of the microprocessor. The state transition table is defined as follows.

When the present state is state "s", the probability that the deadline state "d" is reached is denoted as "Prob(s,d)" and the calculation amount up to the deadline state "d" is denoted as "Cycl(s,d)". The control phase discussed below utilizes the calculation amount "Cycl(s,d)" and probability of reach "Prob(s,d)" from the present state of the program "s∈S" to the state with a deadline "d∈D". The state transition table contains the calculation amount "Cycl" and the probability of reach "Prob" for a path from each state to the deadline state.
Probability of reach: Prob::Map of (S,D) toR
Calculation amount (predicted calculation amount):
Cycl::Map of (S,D) to R The procedure of generating the state transition table is specifically shown below. The state transition table can be generated by adding an average calculation amount at the time of a transition and the probability of each branch at the time of a branch to the state transition graph (FIG. 5 or 6), but can be generated more easily when directly generated by observing the application program. Therefore, a procedure of generating the state transition table ("Prob", "Cycl") for the application program by observing the execution of the application program will be shown below.

The procedure below assumes that the calculation amount (CPU cycle count) for a specified section of the application program can be measured by means of a profile counter for a processor, a CPU simulator, or the like, for example. The calculation amount prediction data generator 22 includes a calculation amount measuring unit which measures a calculation amount for a specified section, for example.

```
Function: to generate a state transition table ("Prob", "Cycl")
for the application program
Variables:
    Frequency of visit, FreqS::Map of S to N
    Visit cycle, CyclS::Map of S to N
    Frequency of transition, FreqT::Map of (S,D) to N
    Transition cycle, CyclT::Map of (S,D) to N
    Visit flag, Visit::Map of S to Bool
Inputs:
    Label set "S" and deadline label set "D"
Outputs:
    Probability of reach "Prob" and cycle count "Cycl"
void mktab__start( )
    label__start( )
    for each s ∈ S do
        FreqS(s) ← 0
        for each d ∈ D do
            FreqT(s,d) ← 0
            CyclT(s,d) ← 0
        od
    od
void mktab__init( )
    for each s ∈ S do
        Visit(s) ← false
        CyclS(s) ← 0
    od
    s ← label__init( )
    Visit(s) ← true
    CycleS(s) ← execution cycle count( )
void mktab__call( )
    s ← label__call( )
    Visit(s) ← true
    CycleS(s) ← execution cycle count ( )
void mktab__time( )
    mktab__call( )
void mktab__fini( )
    for each s ∈ S do
        for each d ∈ D do
            if Visit(s) ∧ Visit(d) ∧ CycleS(s) < CycleS(d) then
                FreqT(s,d) ← FreqT(s,d) + 1
                CyclT(s,d) ← CyclT(s,d) + CycleS(d) − CycleS(s)
            fi
        od
    od
void mktab__stop( )
    for each s ∈ S do
        for each d ∈ D do
            if FreqT(s,d) > 0 then
                Cycl(s,d) ← CyclT(s,d) / FreqT(s,d)
            else
                Cycl(s,d) ← 0
            fi
            if FreqS(s) > 0 then
                Prob(s,d) ← FreqT(s,d) / FreqS(s)
            else
                Prob(s,d) ← 0
            fi
        od
    od
```

In the procedure above, the frequency of visit "FreqS" records the number of occurrences of state "s∈S", and the frequency of transition "FreqT" records the frequency of transition from state "s∈S" to state "d∈D". The transition cycle "CyclT" sums the calculation amount that is required for transition from state "s∈S" to state "d∈D". The visit flag "Visit" and visit cycle "CyclS" record visited states (whether a state has been visited or not) and the cycle count at the time of a visit from the start of a periodic task to the end thereof, respectively.

The variables "FreqS", "FreqT", and "CyclT" are initialized to 0 when the application program is started (START) and "Visit" and "CyclS" are initialized to "false" and "0" when a periodic task is started (INIT), respectively. When the periodic task has finished (FINI), transition relations are determined from the values of "Visit" and "CyclS", and also "FreqT" and "CyclT" are updated. When the program has terminated (STOP), the state transition table ("Cycl", "Prob") is calculated from the values of "FreqS", "FreqT", and "CyclT".

FIG. 9 is a table showing a state during generation of a state transition table according to the above procedure. Each row of the table corresponds to an execution path executed in one periodic task and contains the values of variables "Visit", "CyclS", "FreqS", "CyclT", and "FreqT" as of the termination of the periodic task (FINI).

By way of example, description is given focusing on an execution path <s0, s3, s3, s4, s2, s5> in the third periodic task.

<S0, 1>→1, <s2, 1>→1, <s3, 1>→1, <s3,2>→1, <s4, 1>→1 and <s5,1>→1 of "Visit" shows that the states <s0,1>, <s2, 1>, <s3, 1>, <s3,2>, <s4,1> and <s5,1> were visited in the third periodic task, and <s1,1>→0 shows that <s1,1> was not visited.

<S2,1>→400 K, <s3,1>→100 K, <s3,2>→200 K, <s4, 1>→300 K, and <s5,1>→500 K of "CyclS" shows that, assuming that the cycle count at the time of visiting <s0,1> is 0 K, the cycle count (calculation amount) at the time of a visit to each of the states was 400 K, 100 K, 200 K, 300 K, and 500 K-cycles, respectively. "K" is an abbreviation of "kilocycle".

<S0,1>→3, <s1,1>→1, <s2,1>→3, <s3,1>→2, <s3, 2>→1, <s4,1>→2, and <s5,1>→3 of "FreqS" shows that these states had been visited three, one, three, two, one, two, and three times in total, respectively, when the third periodic task finished.

(<S0,1>,<s4,1>)→500 K, (<s0,1>,<s5,1>)→1200 K, (<S1,1>,<s5,1>)→200 K, . . . , of "CyclT" shows that the total cycle count (calculation amount) for transition between these states was 500 K, 1200 K, 200 K, . . . , respectively, at the point when the third periodic task had finished.

(<S0,1>,<s4,1>)→2, (<s0,1>,<s5,1>)→3, (<s1,1>,<s5, 1>)→1, . . . , of "FreqT" shows that the total number of transitions between these states was two, three and one, respectively, at the point when the third periodic task had finished.

FIG. 10 shows an example of the state transition table generated from information corresponding to the three periodic tasks in the table of FIG. 9.

In this state transition table, a column item "from" represents states except termination of a periodic task and a row item "to" represents deadline states which specify a deadline. As mentioned above, the state transition table contains the probability of a deadline state being reached from each state and the predicted calculation amount (here an average value) from each state to a deadline state.

For instance, paying attention to the cell in which "from" is <s0,1> and "to" is <s4,1>, since there are two transitions from <s0,1> to <s4,1> in total as seen from the table of FIG. 9 and periodic tasks were executed three times in total, the probability that the transition <s0,1> to <s4,1> occurs is ⅔=67% (fractions rounded up). Since the total cycle count that was required for the transition from <s0,1> to <s4,1> is 500 K (200 K for the second time and 300 K for the third time) from the table of FIG. 9 and there were two transitions in total, the average cycle count that was required for transition from <s0,1> to <s4,1> is 500/2=250 K.

<Details of the Control Phase>

A periodic task of the application program 13 is executed and the program state observing unit 21 is made observe the state of the application program 13, and the operating speed controlling unit 23 decides an operating speed for the next state each time there is a state transition (i.e., each time a system call occurs) by using the observed state and the state transition table (calculation amount prediction data) generated in the learning phase. In such a manner, the operating speed of the microprocessor (CPU) 11 during execution of a periodic task is continuously controlled.

Control of the operating speed of the microprocessor 11 is described below in the order of events.

The procedure of operating speed control utilizes time elapsed since the start of a periodic task (INIT). An exemplary procedure for obtaining an elapsed time is shown below. In this procedure, "present time ( )" refers to a actual time clock of the system. The time at which a periodic task starts (INIT) is recorded in a variable "t0" and the elapsed time at the time of a system call is calculated from the difference between the present time and the start time.

```
Function:   to calculate elapsed time
Variable:   time of start   t0:Uint
Input:      none
Output:     elapsed time
void etime_start( )
    return
Uint etime_init( )
    t0←present time ( )
    return ( )
Uint etime_call( )
    return present time ( ) −t0
Uint etime_fini( )
    return present time ( )−t0
void etime_stop ( )
    return
```

In the procedure of operating speed control, an operating speed is determined each time there is a system call as discussed later. As determination of the operating speed, a specific procedure for selecting an operating speed from a number of speeds is shown below.

```
Function: to select an operating speed
Variables:
    NumD::Map of D to N
    FinD::Map of D to N
Inputs:
    Present state "s"
    Present time "t"
Constants:
    Probability of reach, Prob::Map of (S,D) to [0,1]
    Cycle count, Cycl::Map of (S,D) to R
    Speed set, Freq::Map of N to N
Output:
    Operating speed "f"
Const fmax = Freq(1)
Const fmin = Freq(N)
void speed_start( )
    for each d ∈ D do
        NumD(d) ← 100
        FinD(d) ← 100
    od
void speed_init( )
    for each d ∈ D do
        Time(d) ← T(d) * (FinD(d) / NumD(d))
    od
Freq speed_call(Label s, Time t)
    f0 ← 0
    for each d ∈ D do
        if Prob(s,d) > p0 then
            f ← Cycl(s,d) / min(1, Time(d) − t)
            if f > f0 then
                f0 ← f
            fi
        fi
    od
    if f >= fmax then
        return fmax
    fi
    for i = 1 to N do
        if Freq(i) >= f0 then
            return f
```

```
            fi
         od
      void speed_time(Label s, Time t)
         if s ∈ D then
            NumD(s) ← NumD(s) + 1
            if t <= T(s) then
               FinD(s) ← FinD(s) + 1
            fi
         fi
      void speed_fini( )
         return
```

The operating speed selection procedure shown above assumes that the operating speed of the microprocessor (CPU) 11 can be varied in N steps from the minimum speed "Freq(1)" to the maximum speed "Freq(N)" and the map "Freq" satisfies Freq(i)<Freq(j) when i<j.

As described in the procedure (speed_call) performed at the time of a system call, when the present state "s∈S" and time "t" are given, a state with a deadline "d∈D" whose probability of reach "Prob(s,d)" is greater than a threshold value "p0" is selected, thereafter a required speed "f0" is calculated from the calculation amount (cycle count) "Cycl (s,d)" and the remaining time "T(d)−t", and the minimum speed "f" at which processing will be completed within the deadline is selected.

Variables "NumD" and "FinD" maintain the frequency of reach "NumD(d)" to the deadline "d" and the frequency of completion in time "FinD(d)". The value "FinD(d)/NumD(d)" represents the completion rate of deadlines.

When the completion rate of deadline is less than 1, control is provided so as to decrease an effective deadline "Time(d)" which is used in selection of the operating speed. That is, the product of the deadline "T(d)" and the completion rate "FinD(d)/NumD(d)" is set as the effective deadline "Time(d)" (see Time(d)←T(d)×(FinD(d)/NumD(d)) in the selection procedure above), thereby increasing the completion rate. In other words, the lower the completion rate, a shorter effective remaining time (Time (d)−t) is estimated to thereby calculate a higher operating speed (see f←Cycl(s,d)/min(1,Time(d)−t) in the selection procedure above).

Based on the procedures of elapsed time determination and operating speed selection described above, an exemplary procedure of operating speed control is shown below.

```
      Function: to control the operating speed
      Variables:
      Input:
         Present state "s"
         Present time "t"
         Probability of reach "Prob"
         Cycle count "Cycl"
      Output:
         Processing speed f: DOM (Freq)
      void ctrl_start( )
         Prob ← Probability of reach
         Cycl ← Cycle count
         label_start( )
         etime_start( )
         speed_start( )
      void ctrl_init( )
         speed_init( )
         s ← label_init( )
         t ← etime_init( )
         f ← speed_init(s, t)
      void ctrl_call( )
         s ← label_call( )
         t ← etime_call( )
         f ← speed_call(s, t)
      void ctrl_time( )
         s ← label_call( )
         t ← etime_call( )
         speed_time(s, t)
         f ← speed_call(s, t)
      void ctrl_fini( )
         s ← label_fini( )
         t ← etime_fini( )
         speed_time(s, t)
         speed_fini( )
         f ← fmin
      void ctrl_stop( )
         return
```

A specific example of operating speed control for the microprocessor (CPU) shown above will be shown below.

As the state transition table for the application program 13, the one shown in FIG. 11 is used.

It is also assumed that the operating speed of the microprocessor (CPU) can be varied in three steps:

$f$=10, 20, and 40 MHz

Speed control will be illustrated for when the execution path in a periodic task is s0, s1, s2, s5 and when s0, s3, s3, s4, s2, s5 under such conditions.

[Speed Control for the Execution Path of s0, s1, s2, s5]

The initial state is <s0,1>, and when the present time is 0 ms, a deadline state that is reached with a probability equal to or greater than a threshold value of 20% is <s5,1> (<s4,1> is 10%, smaller than the threshold value). An average calculation amount (average cycle count) to reach the state <s5,1> is 300 K (kilocycles). Therefore, calculation of an operating speed that is required for 300 K to be completed within a deadline of 20 ms gives 15 MHz or higher, as shown in the formula below. The lowest speed that satisfies this condition among the operating speeds 10, 20 and 40 MHz adoptable by the CPU is 20 MHz. Therefore, 20 MHz is selected and the application program is processed at the speed of 20 MHz after a system call corresponding to <s0,1>.

```
         s=<s0,1>    //present state
         t=0ms       //present time
         300K/(20−0)ms=15MHz//speed required
            f=20MHz //operating speed
```

Assume that the next state is <s1,1> and the time elapsed at the time of a system call corresponding to <s1,1> is 5 ms. A deadline state that is reached with a probability equal to or greater than the threshold of 20% is <s5,1>. An average calculation amount (average cycle count) to reach the state <s5,1> is 200 K (kilocycles). Therefore, calculation of an operating speed required for 200 K to be completed within the remaining time of 15 (=20−5) ms to the deadline gives 13 MHz or higher, as shown in the formula below. The lowest speed that satisfies this condition among the operating speeds 10, 20 and 40 MHz adoptable by the CPU is 20 MHz. Therefore, 20 MHz is selected and the application program is processed at the speed of 20 MHz after a system call corresponding to <s1,1>.

```
         s=<s1,1>
         t=5ms
         200K/(20−5)ms=13
            f=20MHz
```

Assume that the next state is <s2,1> and the time elapsed at the time of a system call corresponding to <s2,1> is 10 ms. A deadline state that is reached with a probability equal to or greater than the threshold of 20% is <s5,1>. An average calculation amount (average cycle count) to reach the state <s5,1> is 100 K (kilocycles). Therefore, calculation of an operating speed required for 100 K to be completed within the remaining time of 10 (=20−10) ms to the deadline gives 10 MHz or higher, as shown in the formula below. The lowest speed that satisfies this condition among the operating speeds 10, 20 and 40 MHz adoptable by the CPU is 10 MHz. Therefore, 10 MHz is selected and the application program is processed at the speed of 10 MHz after a system call corresponding to <s2,1>.

```
s=<s2,1>
t=10 ms
    100 K/(20−10)ms=10
    f=10 MHz
```

Assume that the next state is the deadline state <s5,1> and the elapsed time at the time of a system call corresponding to <s5,1> is 20 ms. It follows that the execution path has been completed within the deadline. The operating speed is kept at 10 MHz, which has been selected in the last selection.

```
s=<s5,1>
t=20 ms
    completed
    f=10 MHz
```

[Speed Control for the Execution Path of s0, s3, s3, s4, s2, s5]

Exemplary operations of a speed control procedure for when the execution path in a periodic task is s0, s3, s3, s4, s2, s5 will be shown. While the procedure is similar to the previous case, attention should be paid to distinction of state "s3" which occurs twice according to its number of occurrences. The process of calculating an operating speed and a selected operating speed are shown below. Brief supplementary description is provided below.

In states <s3,1> and <s3,2>, there are two deadline states <s4, 1> and <s5,1> that are reached with a probability equal to or greater than the threshold value of 20%. Thus, an operating speed is calculated for each of the deadline states and the higher operating speed is adopted. Then, from among operating speeds 10, 20 and 40 MHz adoptable by the CPU, the lowest speed that satisfies the adopted operating speed is selected. For state <s3,1>, for example, 40 ms is calculated for <s4,1> and 27 ms is calculated for <s5,1>, thus the greater one of them, 40 ms, is adopted. The lowest speed that satisfies this condition among the operating speeds 10, 20 and 40 MHz adoptable by the CPU is 40 MHz. Accordingly, 40 MHz is selected.

```
s=<s0,1>
t=0ms
    300K/(20−0)ms =15
    f=20MHz
s=<s3,1>
t=5ms
    200K/(10−5)ms = 40
    400K/(20−5)ms = 27
    f=40MHz
s=<s3,2>
t=7.5ms
    100K/(10−7.5)ms = 40
    300K/(20−7.5)ms = 24
    f=40MHz
s=<s4,1>
t=10ms
    200K/(20−10)ms = 20
    f=20MHz
s=<s2,1>
t=15ms
    100K/(20−15)ms = 20
    f=20MHz
s=<s5,1>
t=20ms
    completed
    f=20MHz
```

Here, an effect of speed control is illustrated by use of a simple formula for energy estimation. The energy consumption of a microprocessor (CPU) is the product of power consumption and computation time, and the following example assumes that power consumption increases by about the second power of the operating speed. Since the computation time is the computation cycle count divided by the operating speed, the energy consumption is the product of the operating speed and the computation cycle count on the above-mentioned assumption. This is represented by a formula as shown below, where "Energy" represents energy consumption, "Power" represents power consumption, "Time" represents computation time, "Freq" represents operating speed, "Cycle" represents computation cycle count, and "A" is a constant. In the following description, "A"=1.

$$\text{Energy} = \Sigma \, \text{Power} * \text{Time}$$
$$= \Sigma A * Freq^2 * \text{Time}$$
$$= \Sigma A * Freq^2 * (Cycle/Freq)$$
$$= \Sigma A * Freq * Cycle$$

Figure 7:
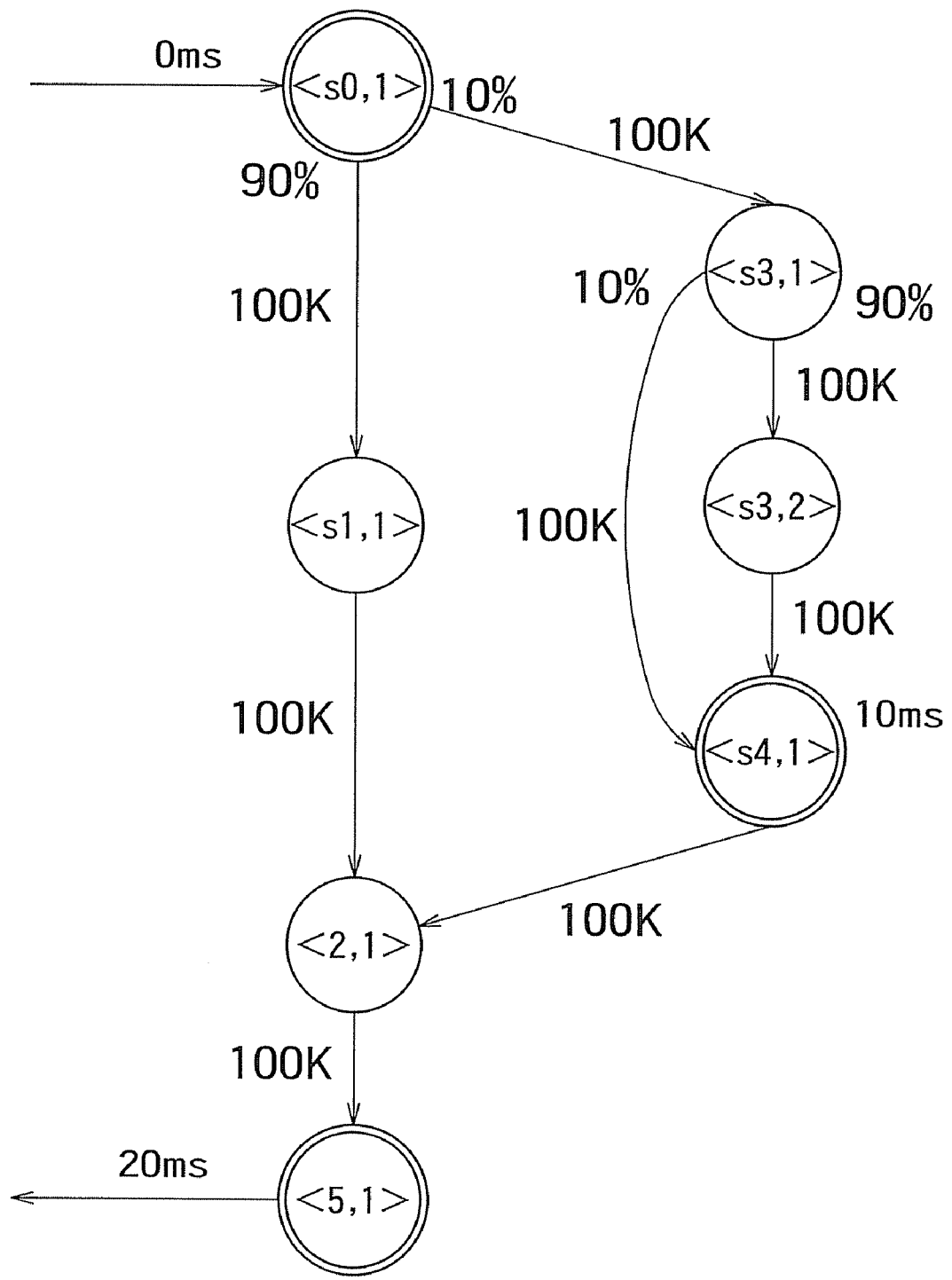
FIG. 7 shows yet another example of the state transition graph.

For the two execution paths (s0, s1, s2, s5) and (s0, s3, s3, s4, s2, S5) described above, energy consumption is calculated for fixed speeds (20 and 40 MHz) and a variable speed (the present invention), and also the time at which the deadlines states "s4" and "s5" are reached in each case is determined. The results are shown below. However, it is assumed here that the predicted cycle counts for all transitions between the states are 100 K as illustrated in the state transition graph of FIG. 7.

```
[Execution path: s0,s1,s2,s5]
    Fixed speed: 20 MHz
        Energy=20*100+20*100+20*100=6000
        Reach to "s5"=300/20=15 ms
    Fixed speed: 40 MHz
        Energy=40*100+40*100+40*100=12000
        Reach to "s5"=300/40=7.5 ms
    Variable speed (the present invention)
        Energy=20*100+20*100+10*100=5000
        Reach to "s5"=20 ms
[Execution path: s0,s3,s3,s4,s2,s5]
    Fixed speed: 20 MHz
        Energy=20*100+20*100+20*100+20*100+20*100=10000
        Reach to "s4"=300/20=15 ms
        Reach to "s5"=500/20=25 ms
```

-continued

```
Fixed speed: 40 MHz
    Energy=40*100+40*100+40*100+40*100+40*100=20000
    Reach to "s4"=300/40=7.5 ms
    Reach to "s5"=500/40=12.5 ms
Variable speed (the present invention)
    Energy=20*100+40*100+40*100+20*100+20*100=14000
    Reach to "s4"=10 ms
    Reach to "s5"=20 ms
```

Based on these results, expected values of energy consumption are compared between the fixed speed of 40 MHz that can meet the deadline in both the execution paths and the variable speed of the present invention. When the first execution path (s0, s1, s2, s5) occurs with a rate of 90% and the second execution path (s0, s3, s3, s4, s2, s5) occurs with a rate of 10% (i.e., when a transition to state <s1,1> takes place with a probability of 90% when in <s0,1>, and to <s3,1> with a probability of 10%) as in FIG. 7, the expected value of energy consumption for the variable speed scheme of the present invention is about 60% of that of the fixed speed scheme, as illustrated by the formula below:

$$(5000*0.9+14000*0.1)/(12000*0.9+20000*0.1)=60\%$$

As has been described above, according to this embodiment, it is possible to reduce energy consumption of a microprocessor and an embedded system including the microprocessor by minimizing change of an application program and appropriately controlling the operating speed of the microprocessor in accordance with characteristics of the application program.

What is claimed is:

1. A microprocessor control apparatus for controlling an operating speed of a microprocessor which executes a program including instruction codes in which a deadline is specified for at least one instruction code, comprising:
   a state observing unit configured to observe an execution state of the program at a plurality of predetermined timings prior to execution of a deadline instruction code which is an instruction code for which the deadline is specified;
   a data storage unit configured to store prediction data of a remaining calculation amount that is required before execution of the deadline instruction code completes for each of a plurality of predefined execution states;
   a predicted calculation amount acquiring unit configured to acquire a remaining calculation amount corresponding to an observed execution state as a remaining predicted calculation amount from the prediction data;
   a remaining time calculating unit configured to calculate a remaining time until the deadline of the deadline instruction code;
   an operating speed calculating unit configured to calculate a minimum operation speed of the microprocessor that is required to process the remaining predicted calculation amount within the remaining time;
   a controlling unit configured to control the microprocessor to operate at the minimum operating speed or higher,
   wherein
   the instruction codes includes two or more deadline instruction codes;
   the operating speed calculating unit calculates the minimum operating speed for each of the deadline instruction codes; and
   the controlling unit controls the microprocessor to operate at an operating speed or higher that is highest among the minimum operating speeds calculated for the deadline instruction codes,
   wherein
   the instruction codes includes a branch instruction code;
   the prediction data contains an execution probability at which each of the deadline instruction codes is executed for each of the predefined execution states; and
   the controlling unit controls the microprocessor to operate at an operating speed or higher that is highest among minimum operating speeds that are calculated for deadline instruction codes having an execution probability equal to or greater than a threshold value.

2. A microprocessor control apparatus for controlling an operating speed of a microprocessor which executes a program including instruction codes in which a deadline is specified for at least one instruction code, comprising:
   a state observing unit configured to observe an execution state of the program at a plurality of predetermined timings prior to execution of a deadline instruction code which is an instruction code for which the deadline is specified;
   a data storage unit configured to store prediction data of a remaining calculation amount that is required before execution of the deadline instruction code completes for each of a plurality of predefined execution states;
   a predicted calculation amount acquiring unit configured to acquire a remaining calculation amount corresponding to an observed execution state as a remaining predicted calculation amount from the prediction data;
   a remaining time calculating unit configured to calculate a remaining time until the deadline of the deadline instruction code;
   an operating speed calculating unit configured to calculate a minimum operation speed of the microprocessor that is required to process the remaining predicted calculation amount within the remaining time;
   a controlling unit configured to control the microprocessor to operate at the minimum operating speed or higher;
   a second state observing unit configured to observe the execution state of the program at the predetermined timings upon each repetition when the instruction codes are repetitively executed;
   a calculation amount measuring unit configured to measure a calculation amount that had been required until the execution of the deadline instruction code completed after observation of the execution state; and
   a prediction data generator configured to find a predicted calculation amount that will be required until the deadline instruction code completes after observation at each of the predetermined timings based on calculation amounts that are measured plural times at the predetermined timings, and map the predicted calculation amount found for each of the predetermined timings to an execution state observed at each of the predetermined timings to thereby create the prediction data.

3. The apparatus according to claim 2, wherein the prediction data generator averages the calculation amounts that are measured plural times for each of the predetermined timings to obtain the predicted calculation amount corresponding to an observed execution state at each of the predetermined timings.

4. The apparatus according to claim 3, wherein the instruction codes include two or more deadline instruction codes; the instruction codes includes a branch instruction code; the prediction data generator calculates, for each of the predetermined timings, an execution probability at which each of the deadline instruction codes is executed based on whether each of the deadline instruction codes has been executed or not after observation of the execution state at each of the predetermined timings, and maps the execution probability of the deadline instruction code calculated for each of the predetermined timings to an observed execution state at each of the predetermined timings in the prediction data; and the controlling unit controls the microprocessor to operate at an operating speed or higher that is highest among minimum operating speeds that are calculated for deadline instruction codes having the execution probability equal to or greater than a threshold value.

5. A microprocessor control apparatus for controlling an operating speed of a microprocessor which executes a program including instruction codes in which a deadline is specified for at least one instruction code, comprising:

a state observing unit configured to observe an execution state of the program at a plurality of predetermined timings prior to execution of a deadline instruction code which is an instruction code for which the deadline is specified;

a data storage unit configured to store prediction data of a remaining calculation amount that is required before execution of the deadline instruction code completes for each of a plurality of predefined execution states;

a predicted calculation amount acquiring unit configured to acquire a remaining calculation amount corresponding to an observed execution state as a remaining predicted calculation amount from the prediction data;

a remaining time calculating unit configured to calculate a remaining time until the deadline of the deadline instruction code;

an operating speed calculating unit configured to calculate a minimum operation speed of the microprocessor that is required to process the remaining predicted calculation amount within the remaining time;

a controlling unit configured to control the microprocessor to operate at the minimum operating speed or higher, and a completion rate calculating unit, wherein the instruction codes is repetitively executed plural times, the completion rate calculating unit calculates a completion rate of execution of the deadline instruction code being completed within the deadline, and the lower the completion rate is, the controlling unit controls the microprocessor to operate at a higher operating speed.

* * * * *